US010492134B2

(12) United States Patent
Shimojou et al.

(10) Patent No.: US 10,492,134 B2
(45) Date of Patent: Nov. 26, 2019

(54) COMMUNICATION CONTROL DEVICE SELECTION METHOD AND COMMUNICATIONS SYSTEM

(71) Applicant: NTT DOCOMO, INC., Chiyoda-ku (JP)

(72) Inventors: Takuya Shimojou, Chiyoda-ku (JP); Masayoshi Shimizu, Chiyoda-ku (JP); Motoshi Tamura, Chiyoda-ku (JP); Ashiq Khan, Chiyoda-ku (JP); Srisakul Thakolsri, Munich (DE); Malla Reddy Sama, Munich (DE); Wolfgang Kiess, Munich (DE); Sergio Beker, Munich (DE)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 15/758,567

(22) PCT Filed: Sep. 13, 2016

(86) PCT No.: PCT/JP2016/076966
§ 371 (c)(1),
(2) Date: Mar. 8, 2018

(87) PCT Pub. No.: WO2017/056966
PCT Pub. Date: Apr. 6, 2017

(65) Prior Publication Data
US 2018/0227841 A1    Aug. 9, 2018

(30) Foreign Application Priority Data

Sep. 28, 2015 (JP) ................................. 2015-189941
Feb. 17, 2016 (JP) ................................. 2016-028261
May 16, 2016 (JP) ................................. 2016-098294

(51) Int. Cl.
H04L 12/28 (2006.01)
H04W 48/18 (2009.01)
H04W 40/02 (2009.01)

(52) U.S. Cl.
CPC ........... H04W 48/18 (2013.01); H04W 40/02 (2013.01)

(58) Field of Classification Search
CPC ...... H04W 48/17; H04W 48/18; H04W 40/02
See application file for complete search history.

(56) References Cited

U.S. PATENT DOCUMENTS

2011/0292896 A1* 12/2011 Yeuom .................. H04W 8/082
370/329
2016/0227457 A1    8/2016 Tanaka et al.
2016/0286459 A1    9/2016 Enomoto et al.

FOREIGN PATENT DOCUMENTS

WO    WO 2015/037650 A1    3/2015
WO         2015/068731 A1    5/2015

OTHER PUBLICATIONS

International Search Report and Written Opinion dated Nov. 8, 2016, in PCT/JP2016/076966, filed Sep. 13, 2016.
(Continued)

Primary Examiner — Bo Hui A Zhu
(74) Attorney, Agent, or Firm — Oblon, McClelland, Maier & Neustadt, L.L.P.

(57) ABSTRACT

In a communications system (1A), a communication service which is utilized by UE (10) is specified from among a first communication service and a second communication service, an address of a SGW (80) corresponding to a service type of the first communication service is retrieved when the specified communication service is the first communication service with reference to information in which the specified communication service and the address of the SGW (80) that transmits and receives data for utilizing the communication (Continued)

service are correlated with each other, and a SGW (80) other than a first communication control device is retrieved when the specified communication service is the second communication service.

6 Claims, 14 Drawing Sheets

(56) References Cited

OTHER PUBLICATIONS

NTT DOCOMO Inc. "Discussion on DNS Procedures for Dedicated Core Network", 3GPP TSG-CT WG4#70 C4-151286, Revision of C4-151269, [online], http://www.3gpp.org/ftp/tsg_ct/WG4_protocollars_ex-CN4/TSGCT4_70_Vancouver/Docs/C4-151286.zip, Aug. 13, 2015, pp. 1-11.

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, 334 pages.

International Preliminary Report on Patentability dated Mar. 29, 2018 in PCT/JP2016/076966, 7 pages.

Japanese Office Action dated Oct. 16, 2018 in Japanese Patent Application No. 2017-543094 (with unedited computer generated English translation), 7 pages.

Japanese Office Action dated Apr. 2, 2019 in patent application No. 2017-543094 (with unedited computer generated English translation).

Extended European Search Report dated Jun. 20, 2018 in Patent Application No. 16851140.0.

NTT DOCOMO, et al., "Introduce the Dedicated Core Network (DECORE) feature", $3^{rd}$ Generation Partnership Project (3GPP), SA WG2 Meeting #109, S2-152107, URL: http://www.3gpp.org/ftp/Meetings_3GPP_SYNC/SA/Docs, retrieved on Jun. 15, 2015, XP050983699.

* cited by examiner

Fig.2

| IMSI | service type |
|------|--------------|
| ABC  | low latency, no mobility |
| DEF  | low latency |
| GHI  | no mobility, high secutity |

Fig.5

| service type | Address |
|---|---|
| low latency | 192.168.0.1 |
| No mobility | 192.168.0.2 |
| High security | 192.168.0.3 |

| service type | APN |
|---|---|
| service 1 | APN#1 |
| service 2 | APN#2 |

(b)

| service type | DCN ID |
|---|---|
| service 3 | DCN ID#1 |
| service 4 | DCN ID#2 |

(c)

| APN or DCN ID | Address |
|---|---|
| APN#1 | xx.yy.zz.aa |
| APN#2 | aa.bb.cc.dd |

COMMUNICATION CONTROL DEVICE SELECTION METHOD AND COMMUNICATIONS SYSTEM

TECHNICAL FIELD

The invention relates to a communication control device selection method and a communications system.

BACKGROUND ART

In the related art, Non-Patent Literature 1 describes that a mobility management entity (MME) is selected on the basis of a terminal type of user equipment (UE) having issued an attachment request and the selected MME selects a serving gateway (SGW) on the basis of load information.

CITATION LIST

Non-Patent Literature

Non-Patent Literature 1: 3GPP TS 23.401

SUMMARY OF INVENTION

Technical Problem

However, according to the related art, there is only means for selecting a SGW on the basis of available resources in each SGW. Accordingly, there is a problem in that there is a likelihood that one piece of UE will not access a plurality of communication control devices suitable for the requirements for each communication service.

Therefore, in order to solve the above-mentioned problem, the invention has an object to provide a device selection method that can dynamically select a communication control device depending on requirements of a plurality of communication services which are required by one piece of UE.

Solution to Problem

In order to achieve the above-mentioned object, according to an embodiment of the invention, there is provided a communication control device selection method of selecting a communication control device to be connected to a terminal in a communications system including the terminal that is able to utilize a first communication service and a second communication service other than the first communication service and communication control devices that transmit and receive data for utilizing the first communication service or the second communication service, the communication control device selection method including: a selection step of specifying one communication service which is utilized by the terminal from among the first communication service and the second communication service, selecting a first communication control device when the specified communication service is the first communication service with reference to information in which the specified communication service and a communication control device that transmits and receives the data for utilizing the communication service are correlated with each other, and selecting a second communication control device other than the first communication control device when the specified communication service is the second communication service with reference to the information.

According to an embodiment of the invention, there is provided a communications system configured to include a terminal that is able to utilize a first communication service and a second communication service other than the first communication service, and communication control devices that transmit and receive data for utilizing the first communication service or the second communication service, the communications system comprising: selection means that specifies one communication service which is utilized by the terminal from among the first communication service and the second communication service, selects a first communication control device when the specified communication service is the first communication service with reference to information in which the specified communication service and a communication control device that transmits and receives the data for utilizing the communication service are correlated with each other, and selects a second communication control device other than the first communication control device when the specified communication service is the second communication service with reference to the information.

According to the invention, a communication service which is utilized by user equipment issuing a connection request is specified among the first communication service and the second communication service, and a communication control device corresponding to the specified communication service is dynamically selected on the basis of the specified communication service. Accordingly, it is possible to appropriately provide a communication service which is requested by a user. Accordingly, it is possible to dynamically select a communication control device depending on requirements of a plurality of communication services (for example, requirements of a network in which each communication service is performed) which is requested by one piece of user equipment (UE). As a result, it is possible to provide an appropriate communication service to a user of a terminal which utilizes a plurality of services.

The communication control device selection method according to the embodiment of the invention may further include a connection step of connecting the terminal to the communication control device which is selected in the selection step. In this case, since a connection request is issued to the communication control device selected in the selection step, it is possible to access a communication control device suitable for the communication service.

The communication control device selection method according to the embodiment of the invention may further include a second selection step of selecting a path setting device that sets a path of data between the terminal and the first communication control device or the second communication control device on the basis of the specified communication service.

In this case, since the path setting device is also selected in addition to one of the first communication control device and the second communication control device, it is possible to determine the path setting device as well as the communication control device together. Accordingly, it is possible to simplify a connection process between the terminal and the communication control device.

In the communication control device selection method according to the embodiment of the invention, information indicating the communication service which is utilized by the terminal may be acquired from the terminal and the communication service may be specified using the information indicating the communication service. Accordingly, since the communication service is specified at the time of access of the terminal, it is possible to specify a communication service with a simple configuration.

In the communication control device selection method according to the embodiment of the invention, information indicating the communication service which is utilized by the terminal may be acquired from another device on the basis of information for identifying the terminal and the communication service may be specified using the information indicating the communication service. In this case, even when information indicating communication services is not stored in the terminal, it is possible to satisfactorily determine the first communication control device or the second communication control device depending on a communication service.

In the communication control device selection method according to the embodiment of the invention, the selection step may include transmitting and receiving a control signal for the communication service which is utilized by the terminal as the data for utilizing the communication service using a control plane which is a path through which the control signal is transmitted. In this case, a communication control device using the control plane can be selected depending on the communication service.

Advantageous Effects of Invention

According to the invention, it is possible to dynamically select a communication control device depending on requirements of a communication service which is required by user equipment (UE).

BRIEF DESCRIPTION OF DRAWINGS

FIG. 2 is a diagram illustrating a data structure of information which is stored in a user attribute storage unit 41.

FIG. 5 is a diagram illustrating a data structure of information which is stored in an address storage unit 73A.

FIG. 14 is a diagram illustrating a table in a modified example.

DESCRIPTION OF EMBODIMENTS

Hereinafter, embodiments of the invention will be described in detail with reference to the accompanying drawings. In description with reference to the drawings, the same elements will be referenced by the same reference signs and description thereof will not be repeated.

First Embodiment

Figure 1:
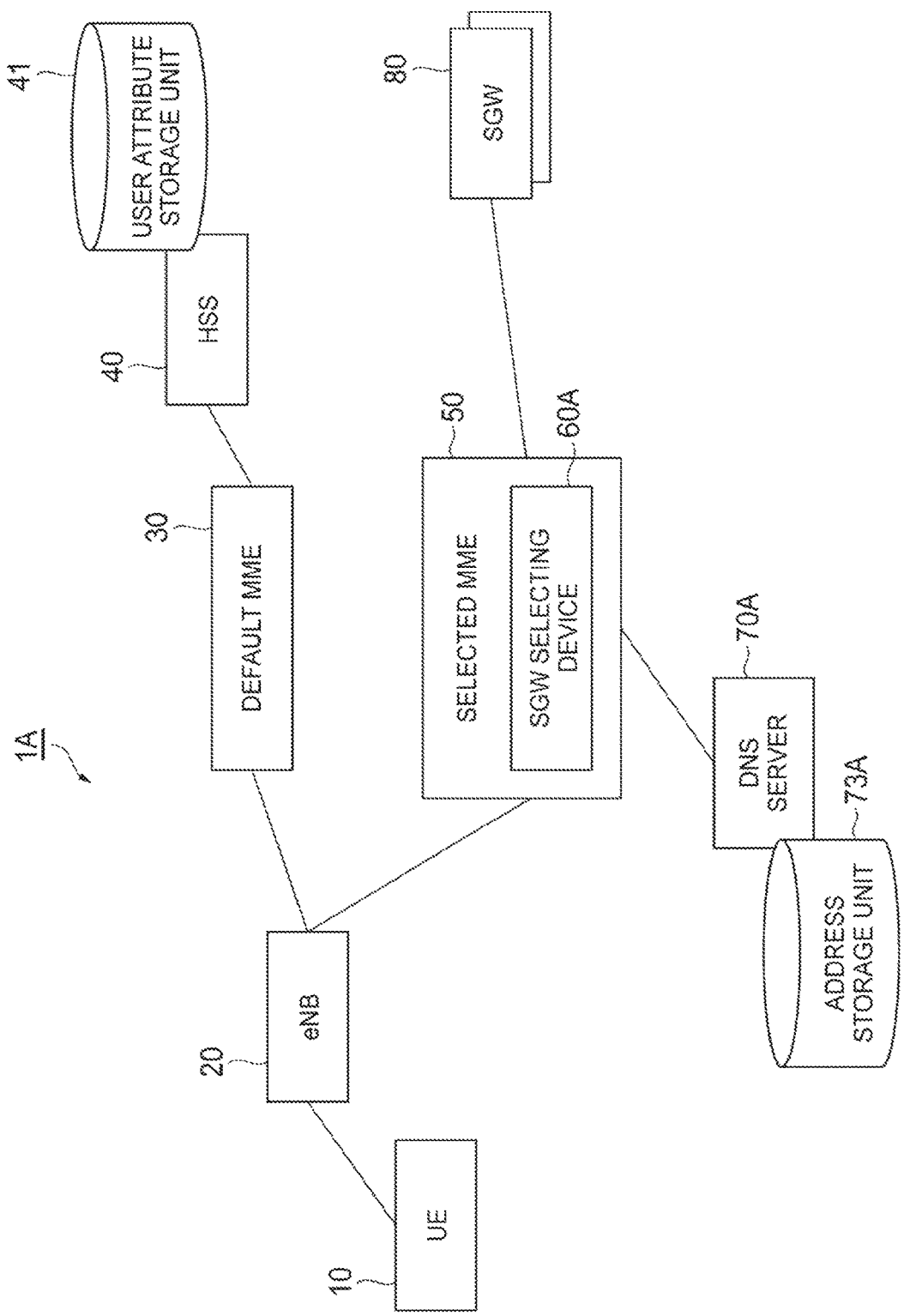
FIG. 1 is a diagram illustrating a system configuration of a communications system according to a first embodiment of the invention.

FIG. 1 is a diagram illustrating a system configuration of a communications system 1A according to an embodiment of the invention. The communications system 1A includes an eNodeB 20, a default mobility management entity (MME) 30, an HSS 40, a selected MME 50 (a path setting device) being an MME which is selected, a serving gateway (SGW) selecting device 60A, a DNS server 70A, and a SGW 80 (a communication control device). User equipment (UE) 10 (a terminal) including a smartphone or a tablet terminal can communicate with the communications system 1A via a communication access. The UE 10 stores information indicating a plurality of communication services which can be used by the UE, and transmits the information to the eNodeB 20. A communication service is a service using communication and is a service such as transmission of a moving image or vehicle-to-vehicle communication. Network requirements differ depending on the services. The UE 10 stores a service type which is information indicating the network requirements as the information indicating communication services.

The eNodeB 20 is a radio base station that is connected to MMEs and is a device that has a radio access control function. The eNodeB 20 has an admission control function when an outgoing call is issued from the UE 10 or a paging function of calling the UE 10 when an incoming call is received by the UE 10 from another UE 10 as basic functions. The eNodeB 20 stores an address of a default MME 30 and issues an attachment request to the address when an attachment request is received from the UE 10.

The default MME 30 is an MME that is connected to the UE 10 via the eNodeB 20 as a default when an attachment request (a location registration request) is issued from the UE 10. Here, an MME is a portion that performs location management and authentication control of UE 10 which is serviced in a long term evolution (LTE) network and a process of setting a communication path of user data between the SGW 80 and the eNodeB 20. The default MME 30 includes a database in which MME information indicating performance and functions of the selected MME 50 is stored. The MME information includes information in which functions and performance (for example, a low cost and little delay) of an MME and an address of the MME are correlated with each other. The MME information includes information for identifying functions and performance. For example, the MME information includes "UE Usage Type" of 3GPP which is information indicating a type indicating functions and performance (for example, type1=low cost, type3=low cost & little delay). The default MME 30 selects an MME to be accessed on the basis of the performance of the UE 10 issuing the attachment request and the MME information. The UE Usage Type may be stored in the UE 10 or may be stored in the HSS 40. The default MME 30 may be a device (a stand-alone device) which is independent from the eNodeB 20 or may be included in the eNodeB 20.

The HSS 40 is a server that manages subscriber information including contract information, authentication information, communication service information, terminal type information, and in-area location information of a communication terminal such as the UE 10 in a database (for example, a user attribute storage unit 41). Here, communication service information is information for defining a type of a communication service which is utilized by each UE 10. The communication service information includes information for identifying UE 10 (for example, an international mobile subscriber identity (IMSI)) and a service type indicating requirements of a communication service which is utilized by the UE 10. An example of the information is illustrated in FIG. 2. As illustrated in FIG. 2, communication service information includes an IMSI for identifying a terminal and a service type. The example illustrated in FIG. 2 represents that a user of UE 10 with an IMSI of "ABC" can utilize communication services with service types of "low latency" and "no mobility." That is, the user can utilize a plurality of communication services. When a terminal ID is acquired from the default MME 30 and a service type acquisition request is received, the HSS 40 transmits a service type corresponding to the terminal ID to the default MME 30. The HSS 40 also has information in which an IMSI and a UE Usage Type are correlated as terminal type information.

The selected MME 50 is an MME which is selected by the default MME 30. The selected MME 50 performs a path setting process for user data on the SGW 80 which is determined through a process which will be described later. The selected MME 50 includes a SGW selecting device 60A. The SGW selecting device 60A is a device that acquires an address of the SGW 80 corresponding to the service type acquired from the eNodeB 20 from the DNS server 70A and accesses the acquired address.

The DNS server 70A is a computer that manages a corresponding relationship between a domain name or a host name and an IP address over a network. The DNS server 70A stores information in which a service type and an address of the SGW 80 are correlated in an address storage unit 73A. When an address transmission request is received from the SGW selecting device 60A, the DNS server 70A transmits the address of the SGW 80 corresponding to the request to the SGW selecting device 60A with reference to the address storage unit 73A.

The SGW 80 is a serving packet exchanger accommodating LTE and transmits and receives user data which is used to provide a communication service to and from a packet data network gate way (PGW). A plurality of SGWs 80 are provided to correspond to requirements of a plurality of communication services.

Elements of the SGW selecting device 60A and the DNS server 70A by which the communications system 1A is characterized will be described below with reference to FIG. 3.

Figure 3:
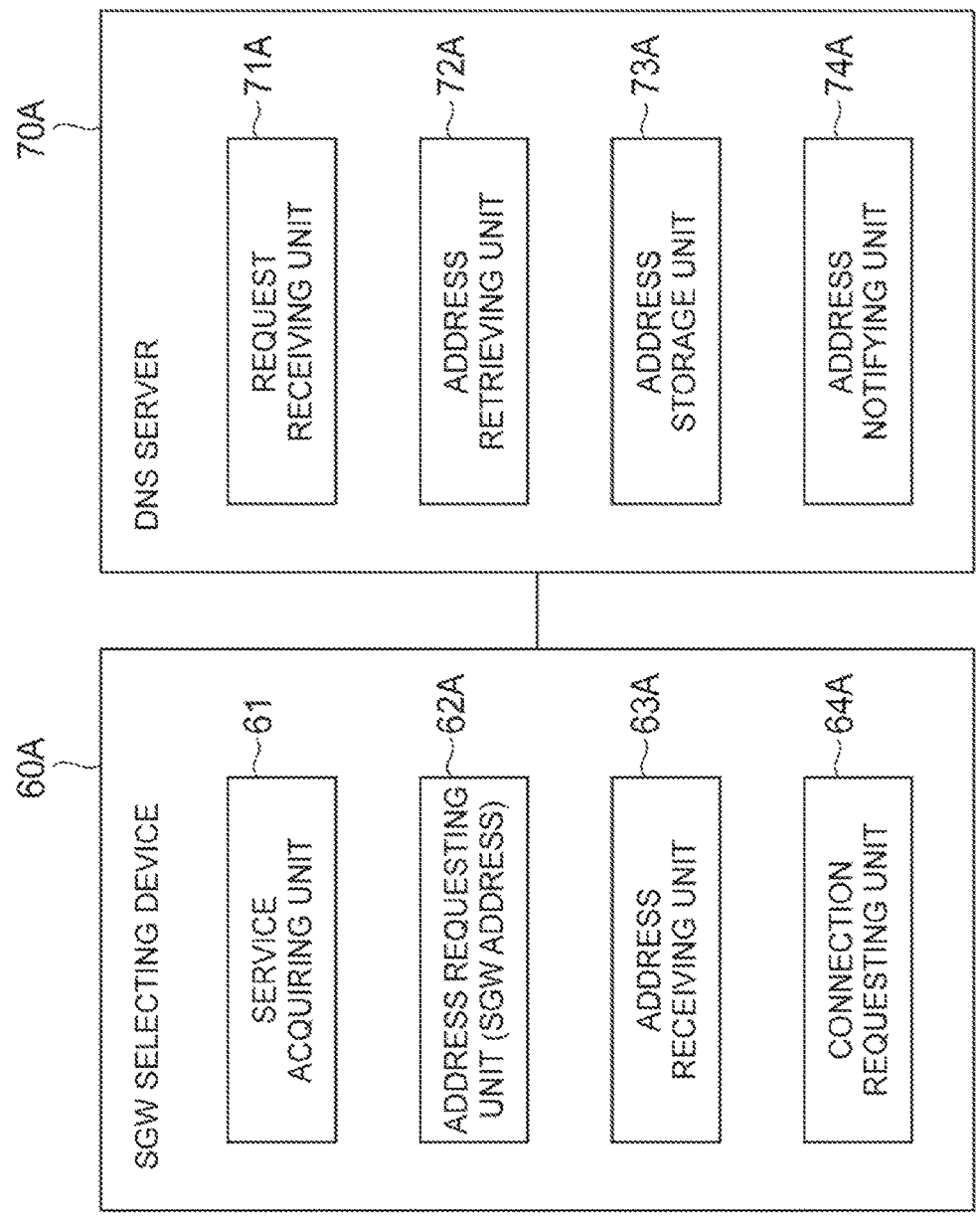
FIG. 3 is a diagram illustrating functional blocks of some devices in the communications system according to the first embodiment of the invention.

As illustrated in FIG. 3, the SGW selecting device 60A includes a service acquiring unit 61, an address requesting unit 62A, an address receiving unit 63A, and a connection requesting unit 64A. The DNS server 70A includes a request receiving unit 71A, an address retrieving unit 72A (selection means), an address storage unit 73A, and an address notifying unit 74A.

Figure 4:
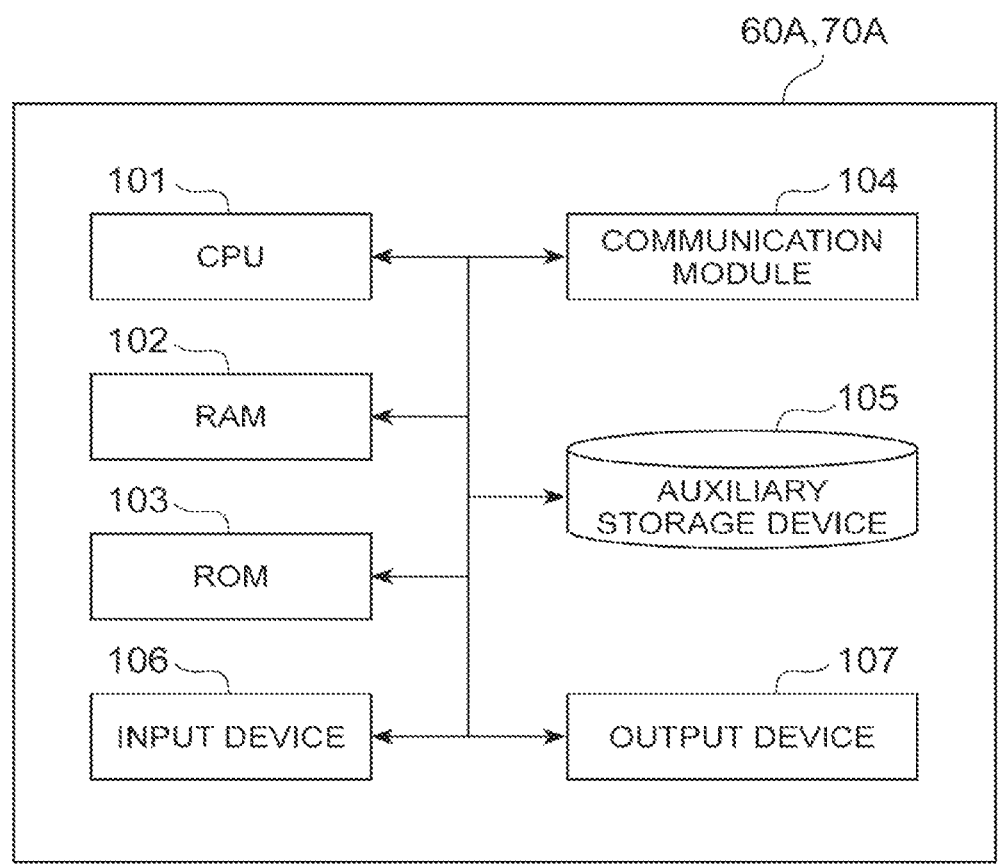
FIG. 4 is a diagram illustrating a hardware configuration of the communications system.

Physically, as illustrated in FIG. 4, the SGW selecting device 60A and the DNS server 70A are configured as a computer system including one or more CPUs 101, a RAM 102 and a ROM 103 which are main storage devices, a communication module 104 (a transmitter or a receiver) which is a data transmitting/receiving device, an auxiliary storage device 105 (a memory) such as a hard disk or a flash memory, an input device 106 such as a touch panel and a keyboard which are input devices, and an output device 107 such as a display. In the SGW selecting device 60A and the DNS server 70A, the communication module 104, the input device 106, and the output device 107 are operated under the control of the CPU 101 by reading predetermined computer software to hardware such as the CPU 101 and the RAM 102 illustrated in FIG. 4, and a series of functions of the devices are implemented by reading and writing data from and to the RAM 102 or the auxiliary storage device 105.

Instead of causing a processor such as the CPU 101 to perform the functions illustrated in FIG. 3, all or some of the functions may be implemented by constructing a dedicated integrated circuit (IC). For example, the functions may be implemented by constructing a dedicated integrated circuit for performing image processing or communication control.

Regardless of whether it is called software, firmware, middleware, microcode, hardware description language, or another name, software can be interpreted broadly to refer to commands, a command set, codes, code segments, program codes, a program, a sub program, a software module, an application, a software application, a software package, a routine, a sub routine, an object, an executable file, an execution thread, an order, a function, or the like.

Software, commands, and the like may be transmitted and received via a transmission medium. For example, when software is transmitted from a website, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

The service acquiring unit 61 of the SGW selecting device 60A is a portion that acquires information (a service type) indicating a communication service from the eNodeB 20 and receives a SGW selection request. For example, the service acquiring unit 61 receives an attachment request as the SGW selection request from the eNodeB 20. The service acquiring unit 61 sends the acquired service type to the address requesting unit 62A.

The address requesting unit 62A of the SGW selecting device 60A is a portion that receives the service type from the service acquiring unit 61, transmits the service type to the DNS server 70A, and issues an address transmission request of the SGW.

The address receiving unit 63A of the SGW selecting device 60A is a portion that receives an address of a SGW from the DNS server 70A. When an address is transmitted by the DNS server 70A after an address request is issued by the address requesting unit 62A, the address receiving unit 63A receives the address. When the address is received, the address receiving unit 63A sends the address to the connection requesting unit 64A.

The connection requesting unit 64A of the SGW selecting device 60A is a portion that issues a connection request to the SGW 80 having the address received by the address receiving unit 63A.

The elements of the DNS server 70A will be described below. The request receiving unit 71A is a portion that receives a service type from the SGW selecting device 60A and receives an address transmission request. The request receiving unit 71A sends the received service type to the address retrieving unit 72A.

The address retrieving unit 72A is a portion that retrieves an address of a SGW corresponding to the service type from the address storage unit 73A. When the service type is acquired from the request receiving unit 71A, the address retrieving unit 72A extracts an address corresponding to the service type with reference to information stored in the address storage unit 73A using the service type as a retrieval key. The address retrieving unit 72A sends the extracted address to the address notifying unit 74A.

The address storage unit 73A is a portion that stores information in which a service type and an address of a SGW corresponding to the service type are correlated. An example of the information stored in the address storage unit 73A is illustrated in FIG. 5. As illustrated in FIG. 5, "Service type" indicating a service type and "Address" indicating an address of a SGW are stored in correlation with each other. With reference to the information illustrated in FIG. 5, the address retrieving unit 72A extracts an address "192.168.0.1" when the service type is "Low latency," and extracts an address "192.168.0.3" when the service type is "High security."

The address notifying unit 74A is a portion that transmits the address extracted by the address retrieving unit 72A to the SGW selecting device 60A.

Figure 6:
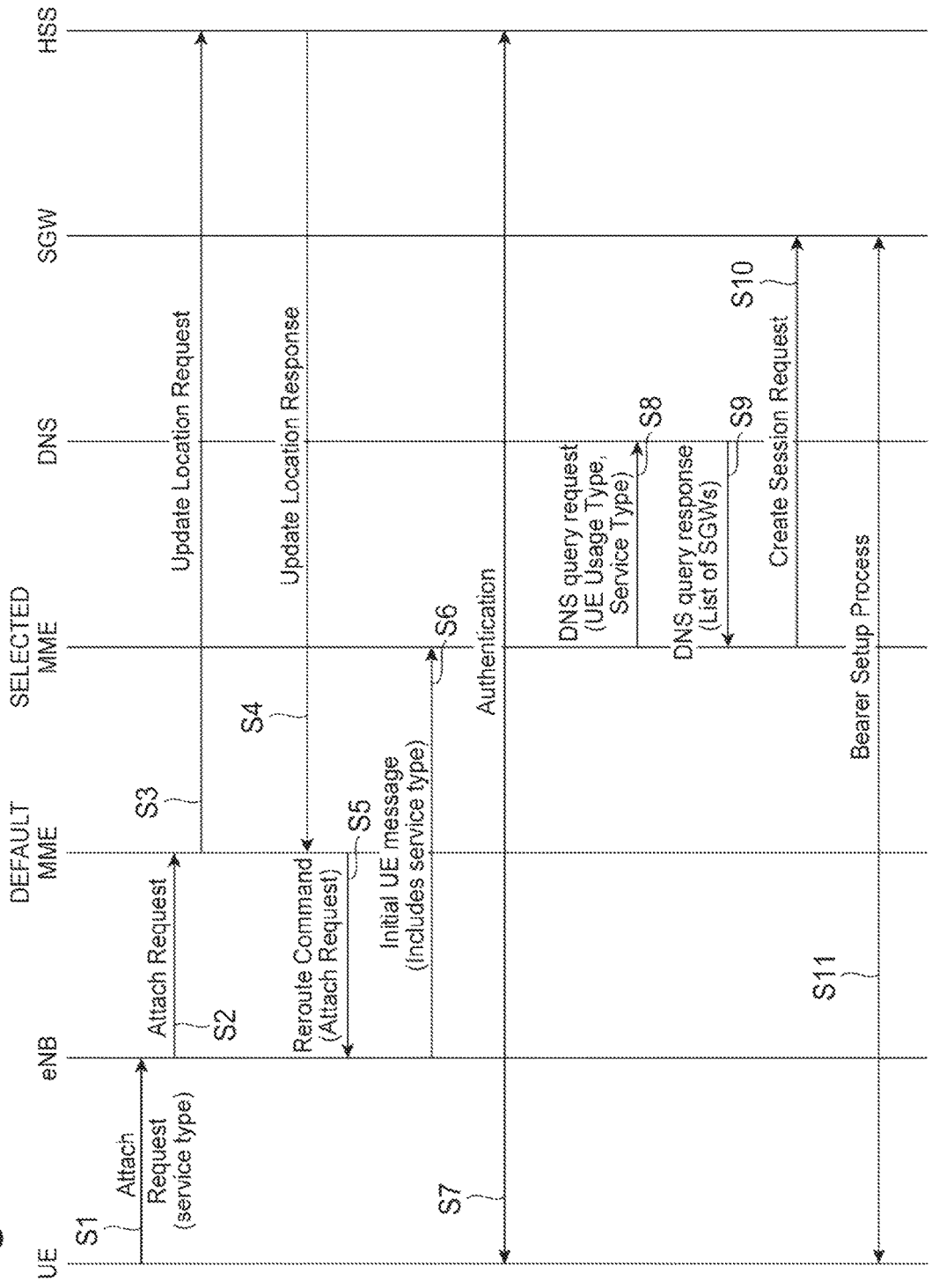
FIG. 6 is a sequence diagram illustrating an attachment process when a service type is acquired from a terminal.
Figure 7:
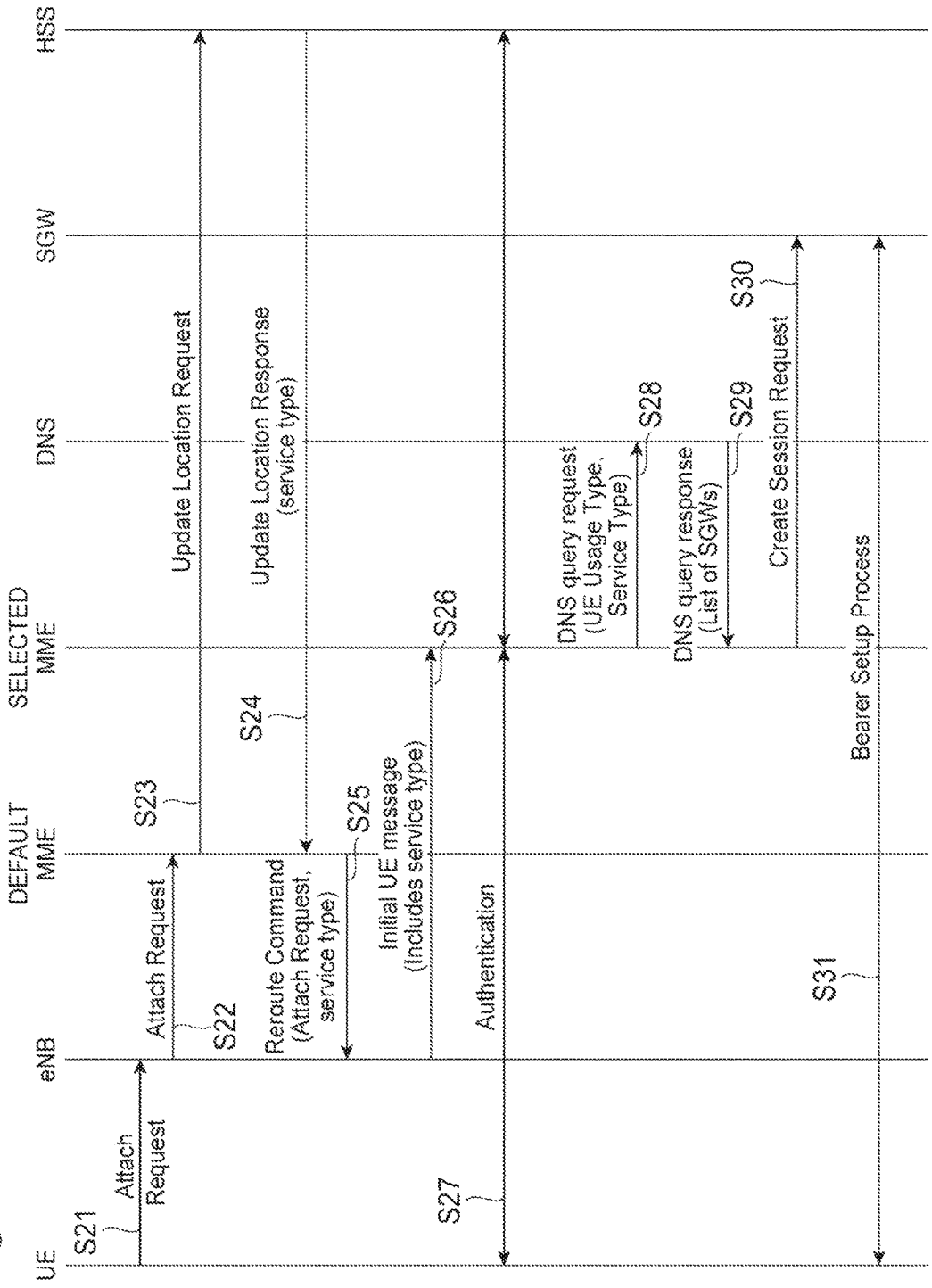
FIG. 7 is a sequence diagram illustrating an attachment process when a service type is acquired from an HSS.

A communication control device selection method in the communications system 1A will be described below with reference to FIGS. 6 and 7. FIG. 6 is a sequence diagram illustrating an attachment process when the UE 10 transmits a service type, and FIG. 7 is a sequence diagram illustrating an attachment process when a service type is acquired from the HSS 40.

First, the attachment process when the UE 10 transmits a service type will be described with reference to FIG. 6.

First, the UE 10 issues an attachment request by transmitting a service type stored in the UE along with an Attach Request signal to the eNodeB 20 (Step S1). When a plurality of service types are stored, the UE 10 transmits the plurality of service types. The eNodeB 20 issues an attachment request (Attach Request) to the default MME 30 using an Initial UE signal in response to the attachment request (Step S2).

Thereafter, the default MME 30 transmits an Update Location Request signal indicating a location registration request to the HSS 40 (Step S3), acquires a UE Usage Type from the HSS 40, and receives an Update Location Response signal (Step S4). The UE 10 may transmit a UE Usage Type stored in the UE along with the Attach Request signal.

The default MME 30 determines an MME (the selected MME 50) as a connection destination on the basis of the UE Usage Type of the UE 10, and transmits a Re-route Command signal indicating an attachment request to the selected MME 50 to the eNodeB 20 (Step S5). In response thereto, the eNodeB 20 transmits a service type to the selected MME 50 and issues an attachment request (an Initial UE message) (Step S6). The service acquiring unit 61 of the SGW selecting device 60A receives the attachment request and acquires the service type. When a plurality of service types are stored in the UE 10, the service acquiring unit 61 of the SGW selecting device 60A acquires the plurality of service types all at once.

As described above, When the eNodeB 20 issues an attachment request to the selected MME 50, new authentication (re-authentication) of the UE 10 is performed among the UE 10, the eNodeB 20, the selected MME 50, and the HSS 40 (Step S7).

Subsequently, the address requesting unit 62A of the SGW selecting device 60A transmits all the service types acquired by the service acquiring unit 61 to the DNS server 70A and issues an address request (a DNS query request) of the SGW 80 (Step S8).

The request receiving unit 71A of the DNS server 70A DNS server 70A receives the service type and receives the address request. The request receiving unit 71A sends the received service type to the address retrieving unit 72A. The address retrieving unit 72A acquires addresses of the SGWs corresponding to the service types from the address storage unit 73A using the service types as a retrieval key.

When an address of a SGW is acquired, the address retrieving unit 72A of the DNS server 70A sends the address of the SGW to the address notifying unit 74A. When a plurality of service types are received by the request receiving unit 71A of the NDS server 70A, the address retrieving unit 72A sends addresses corresponding to the service types. The address notifying unit 74A transmits a list of the SGW addresses to the SGW selecting device 60A (Step S9, a DNS query response)

When the address receiving unit 63A of the SGW selecting device 60A receives the list of SGW addresses, the connection requesting unit 64A transmits a Create Session Request signal indicating a session creation request to the devices (the selected SGWs) indicated by the received SGW addresses (Step S10). Thereafter, a known bearer setup process (for example, a process subsequent to Create Session Request of Initial Attach Procedure in 3GPP TS 23.401) between the UE 10 and the SGW 80 is performed (Step S11) and the routine ends.

The attachment process when a service type is acquired from the HSS 40 will be described below with reference to FIG. 7. First, the UE 10 issues an attachment request by transmitting an Attach Request signal to the eNodeB 20 (Step S21). The eNodeB 20 issues an attachment request (Attach Request) to the default MME 30 in response to the attachment request (Step S22).

Thereafter, the default MME 30 transmits a service type transmission request of the UE 10 along with an Update Location Request signal indicating a location registration request to the HSS 40 (Step S23), receives an Update Location Response signal from the HSS 40 and acquires the service type corresponding to an IMSI of the UE 10 and the UE Usage Type corresponding to the IMSI (Step S24). Steps S25 to S31 are the same as Steps S5 to S11 illustrated in FIG. 6 and thus description thereof will not be repeated.

In the communications system 1A according to the first embodiment, a communication service which is utilized by the UE 10 is specified from a first communication service (for example, a communication service with a service type of "Low Latency") and a second communication service (for example, a communication service with a service type of "High Security"), an address ("192.168.0.1" in the example illustrated in FIG. 5) of the SGW 80 (a first communication control device) corresponding to the service type of "Low Latency" is extracted when the specified communication service is the first communication service with reference to information (the address storage unit 73A) in which the specified communication service is correlated with the address of the SGW 80 that transmits and receives data for utilizing the communication service, and an address ("192.168.0.3" in the example illustrated in FIG. 5) of the SGW 80 (a second communication control device) corresponding to the service type of "High Security" other than that of the first communication control device is extracted when the specified communication service is the second communication service.

In this way, in the communications system 1A, the communication service which is utilized by the UE 10 issuing a connection request is specified and the SGW 80 is dynamically selected on the basis of the specified communication service. Accordingly, it is possible to appropriately provide a communication service which is requested by a user. Accordingly, it is possible to dynamically select the SGW 80 depending on requirements of the service which is requested by the UE 10 (for example, network requirements for executing the service). As a result, it is possible to provide an appropriate communication service to a user of the UE 10 which utilizes a plurality of services.

When the SGW selecting device 60A receives an address of a SGW 80 from the DNS server 70A, the connection requesting unit 64A issues a connection request (a Create Session signal) to the SGW 80 corresponding to the received address of the SGW 80. In this case, since the connection request is issued to the SGW 80 retrieved by the DNS server 70A, it is possible to connect the UE 10 to a SGW 80 suitable for the communication service which is utilized.

The SGW selecting device 60A acquires a service type transmitted from the UE 10, transmits the service type to the DNS server 70A, and acquires an address of a SGW 80 corresponding to the service type. In this case, since a communication service is specified at the time of connection of the UE 10, it is possible to specify a communication service with a simple configuration.

When a service type is not acquired from the UE 10, the SGW selecting device 60A acquires a service type from the HSS 40 (an external device). In this case, even when the UE 10 has not store information indicating the communication service, it is possible to determine an address of a SGW 80 corresponding to the service type.

The address storage unit 73A of the DNS server 70A stores an address corresponding to a service type. Accordingly, when the address is changed, only the address storage unit 73A of the DNS server 70A has to be subjected to rewriting, which is very efficient.

Second Embodiment

Figure 8:
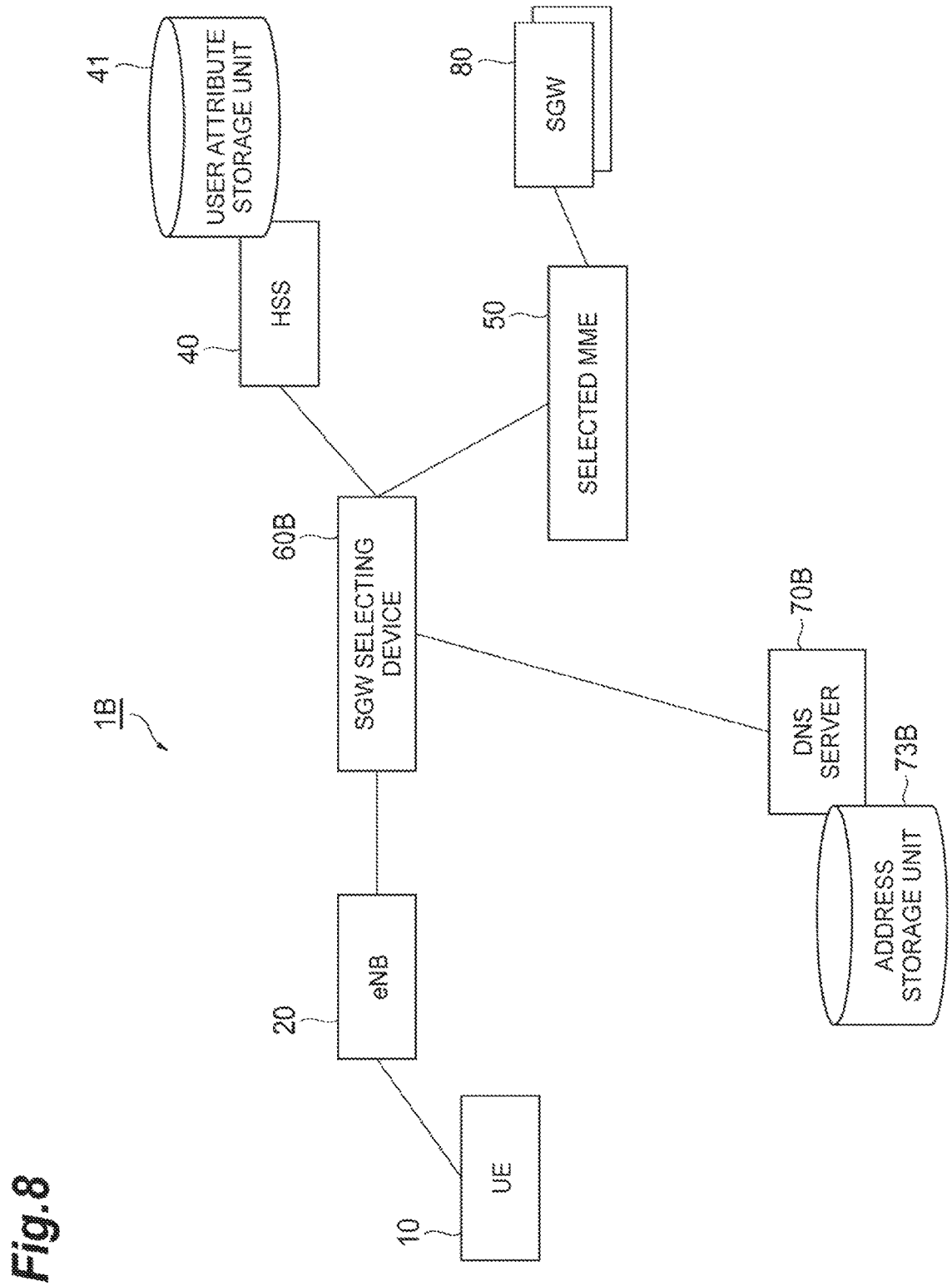
FIG. 8 is a diagram illustrating a system configuration of a communications system according to a second embodiment.

In the above-mentioned embodiment, the SGW selecting device 60A included in the selected MME 50 has been described, but a SGW selecting device 60B according to this embodiment also issues a request to select an MME which is connected to the UE 10. FIG. 8 is a diagram illustrating a system configuration of a communications system 1B according to a second embodiment of the invention. The communications system 1B according to the second embodiment does not include the default MME 30 of the communications system 1A according to the first embodiment and the SGW selecting device 60B performs the function of the default MME 30 (determining the selected MME 50) in the communications system 1A according to the first embodiment. The SGW selecting device 60B is independent from the selected MME 50.

As illustrated in FIG. 8, the SGW selecting device 60B transmits a service type and a UE Usage Type to a DNS server 70B and issues a request to transmit a list of MMEs and SGWs. When the list of MMEs and SGWs is received from the DNS server 70B, the SGW selecting device 60B accesses a selected MME 50 specified by the list of MMEs, and the selected MME 50 issues a connection request to a SGW 80 specified by the list of SGWs.

Figure 9:
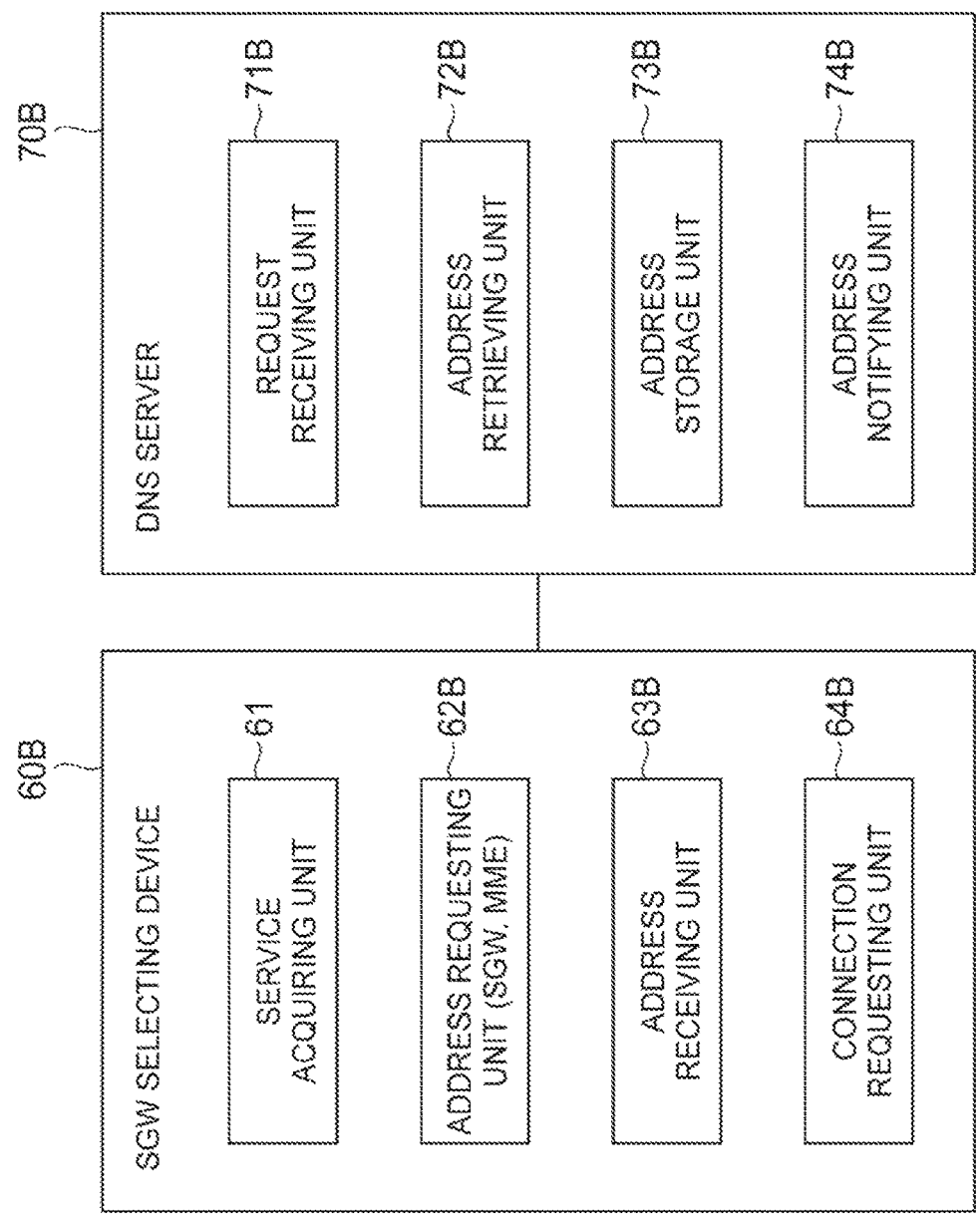
FIG. 9 is a diagram illustrating functional blocks of some devices in the communications system according to the second embodiment of the invention.

A block diagram of a system according to the second embodiment is illustrated in FIG. 9. As illustrated in FIG. 9, the SGW selecting device 60B includes a service acquiring unit 61, an address requesting unit 62B, an address receiving unit 63B, and a connection requesting unit 64B. The DNS server 70B includes a request receiving unit 71B, an address retrieving unit 72B, an address storage unit 73B, and an address notifying unit 74B.

The service acquiring unit 61 of the SGW selecting device 60B acquires a user service type and an UE Usage Type from the UE 10 via the eNodeB 20. When the user service type and the UE Usage Type are not acquired from the UE 10, the service acquiring unit 61 acquires the user service type and the UE Usage Type from the HSS 40.

The address requesting unit 62B of the SGW selecting device 60B transmits the service type and the UE Usage Type acquired by the service acquiring unit 61 to the DNS server 70B, and issues an address transmission request for an address of the selected MME 50 and an address of the SGW 80.

The address receiving unit 63B of the SGW selecting device 60B is a portion that receives the address of the selected MME 50 and the address of the SGW 80 from the DNS server 70B.

The connection requesting unit 64B of the SGW selecting device 60B is a portion that issues a connection request to the selected MME 50 and the SGW 80 on the basis of the addresses received by the address receiving unit 63B. Specifically, the connection requesting unit 64B issues a connection request to the selected MME 50 on the basis of the address of the selected MME 50, notifies the selected MME 50 of the address of the SGW 80, and requests connection to the SGW 80.

The elements of the DNS server 70B will be described below. The request receiving unit 71B is a portion that receives a service type and a UE Usage Type from the SGW selecting device 60B and receives an address transmission request. The request receiving unit 71B sends the received service type and the received UE Usage Type to the address retrieving unit 72B.

The address retrieving unit 72B is a portion that retrieves an address of a SGW corresponding to the service type from the address storage unit 73B and retrieves an MME corresponding to the service type or the UE Usage Type from the address storage unit 73B. When the service type is acquired from the request receiving unit 71B, the address retrieving unit 72B extracts an address corresponding to the service type with reference to information in which the service type stored in the address storage unit 73B and the address of the SGW are correlated using the service type as a retrieval key. When the address is extracted, the address retrieving unit 72B sends the address to the address notifying unit 74B. The address retrieving unit 72B searches the address storage unit 73B in which an address of the selected MME 50 corresponding to the service type or the UE Usage Type is stored, and acquires the address of the selected MME 50 corresponding to a retrieval key using the service type or the UE Usage Type as the retrieval key.

The address storage unit 73B stores information in which a service type and an address of a SGW corresponding to the service type are correlated. The address storage unit 73B stores information in which the service type or the UE Usage Type and an address of an MME corresponding to the service type or the UE Usage Type are correlated.

The address notifying unit 74B is a portion that transmits the address extracted by the address retrieving unit 72B to the SGW selecting device 60B.

Figure 10:
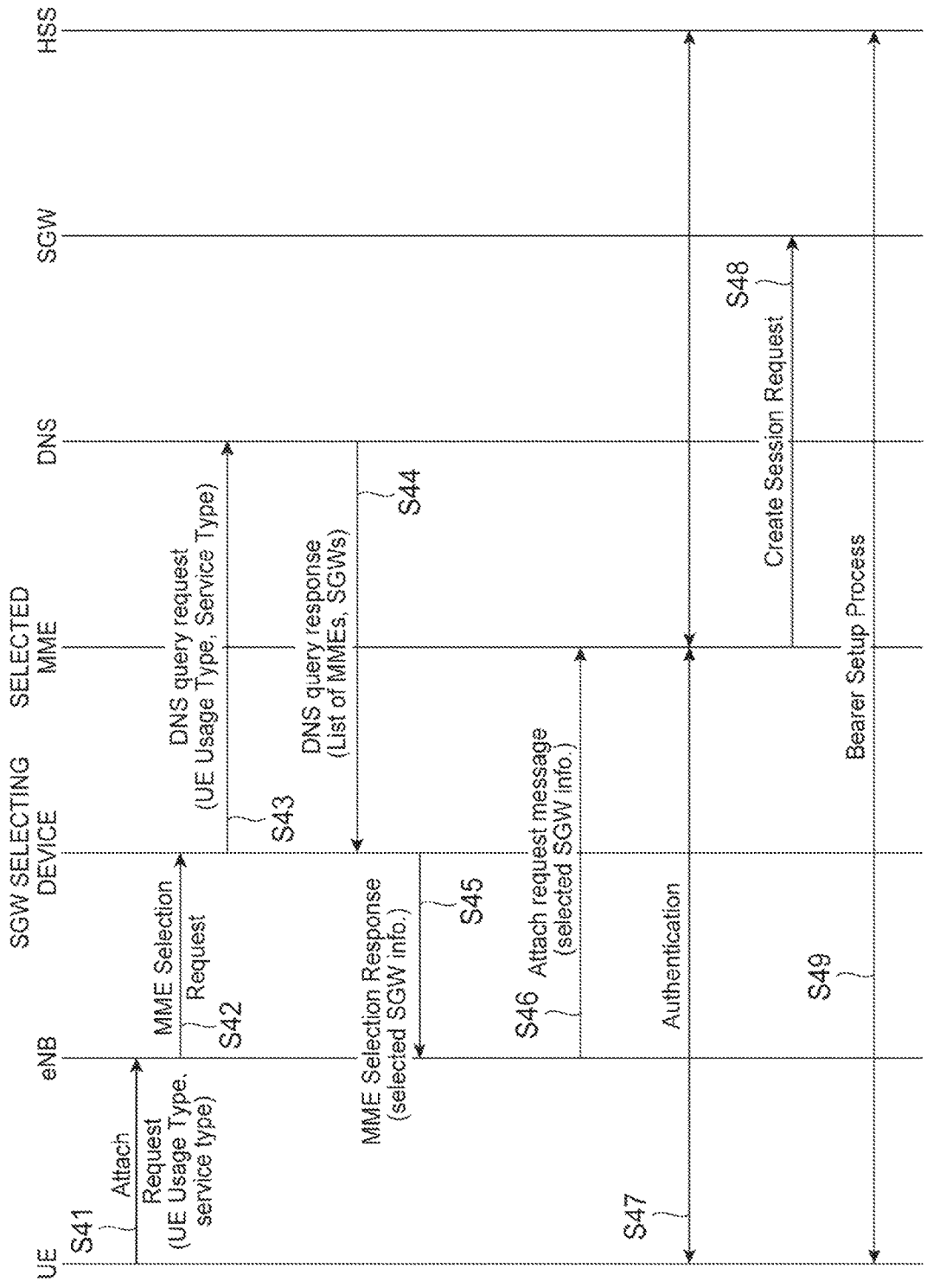
FIG. 10 is a sequence diagram illustrating an attachment process when a service type is acquired from a terminal.
Figure 11:
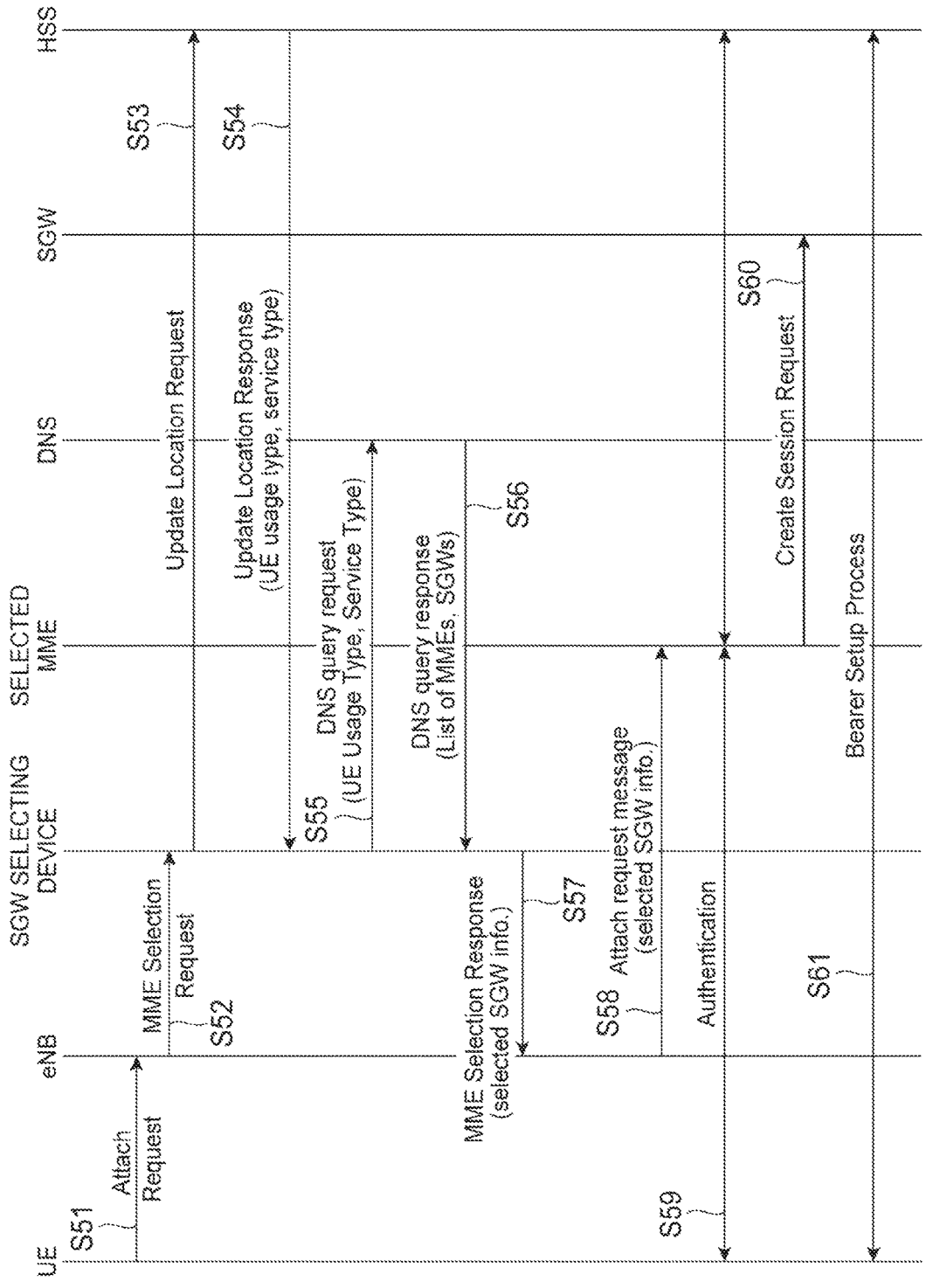
FIG. 11 is a sequence diagram illustrating an attachment process when a service type is acquired from an HSS.

A selection method in the communications system 1B will be described below with reference to FIGS. 10 and 11. FIG. 10 is a sequence diagram illustrating an attachment process when UE 10 transmits a service type, and FIG. 11 is a sequence diagram illustrating an attachment process when a service type is acquired from the HSS 40.

First, the attachment process when an UE 10 transmits a service type will be described with reference to FIG. 10.

First, the UE 10 issues an attachment request by transmitting a service type and a UE Usage Type stored in the UE along with an Attach Request signal to the eNodeB 20 (Step S41). The eNodeB 20 issues an MME retrieval request to the SGW selecting device 60B using an MME Selection Request signal in response to the attachment request (Step S42).

Thereafter, the address requesting unit 62B of the SGW selecting device 60B transmits the service type and the UE Usage Type to the DNS server 70B and issues a request (DNS query request) for addresses of the selected MME 50 and the SGW 80 (Step S43).

The request receiving unit 71B of the DNS server 70B receives the service type and the UE Usage Type and transmits the received service type and the received UE Usage Type to the address retrieving unit 72B. The address retrieving unit 72B acquires an address of the SGW 80 corresponding to the service type and acquires an address of the selected MME 50 corresponding to the service type or the UE Usage Type. The address retrieving unit 72B notifies the address notifying unit 74A of the acquired address. The address notifying unit 74B transmits the acquired addresses to the SGW selecting device 60B (Step S44, DNS query response).

When the address of the selected MME 50 and the address of the SGW 80 are received from the DNS server 70B, the address receiving unit 63B sends the addresses of the selected MME 50 and the SGW 80 to the connection requesting unit 64B.

The connection requesting unit 64B transmits an MME Selection Response signal which is a signal indicating the retrieval result of the selected MME 50 along with the retrieved address of the selected MME 50 and the retrieved address of the SGW 80 to the eNodeB 20 (Step S45).

When the MME Selection Response signal is received, the eNodeB 20 transmits an Attach Request Message indicating an attachment request along with the address of the SGW 80 to the address of the selected MME 50 (Step S46).

When the eNodeB 20 issues an attachment request to the selected MME 50, new authentication (re-authentication) of the UE 10 is performed among the UE 10, the eNodeB 20, the selected MME 50, and the HSS 40 (Step S47, Authentication). The selected MME 50 transmits a Create Session Request signal indicating a session creation request to the device (the selected SGW) indicated by the received address of the SGW (Step S48). Thereafter, a known bearer setup process (for example, a process subsequent to Create Session Request of Initial Attach procedure in 3GPP TS 23.401) between the UE 10 and the SGW 80 is performed (Step S49), and the routine ends.

The attachment process when a service type is acquired from the HSS 40 will be described below with reference to FIG. 11. First, the UE 10 issues an attachment request by transmitting an Attach Request signal to the eNodeB 20 (Step S51). The eNodeB 20 issues an MME selection request by transmitting an MME Selection Request signal to the SGW selecting device 60B in response to the attachment request (Step S52).

Thereafter, the SGW selecting device 60B transmits a service type transmission request along with an Update Location Request signal indicating a location registration request to the HSS 50 (Step S53), receives an Update Location Response signal from the HSS 40, and acquires the service type and the UE Usage Type corresponding to the IMSI of the UE 10 (Step S54). Steps S55 to S61 are the same as Steps S43 to S49 illustrated in FIG. 10 and thus description thereof will not be repeated.

In the communications system 1B according to this embodiment, the address retrieving unit 72B acquires the address indicating the selected MME 50 using the service type acquired by the request receiving unit 71B. In this way, since the process of determining the selected MME 50 and the process of determining the SGW 80 can be performed together, it is possible to simplify the process in comparison with a case in which determination of a selected MME 50 and determination of a SGW 80 are performed by different devices. That is, a connection process between the UE 10 and the SGW 80 can be simplified.

Third Embodiment

Figure 12:
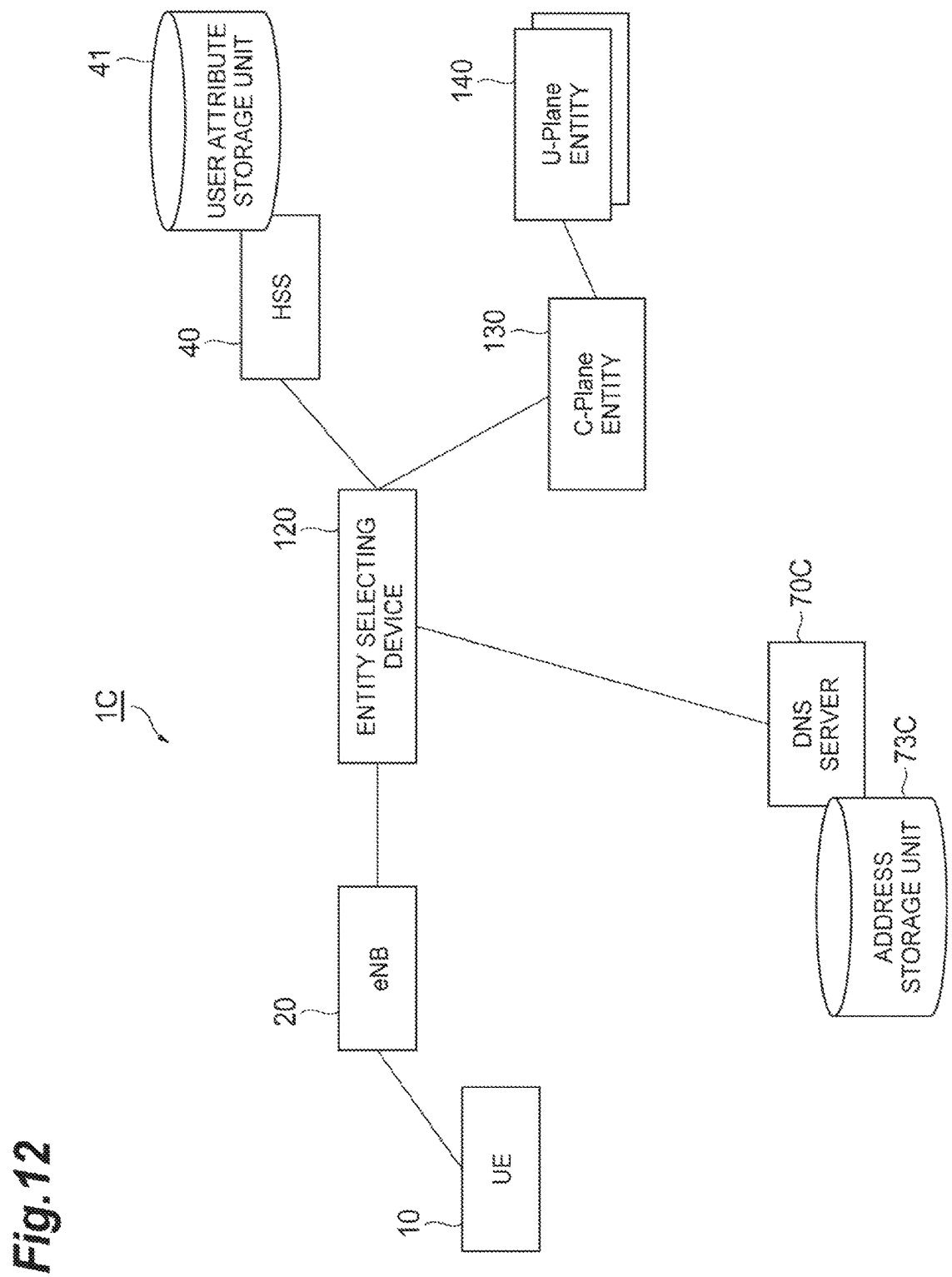
FIG. 12 is a diagram illustrating a system configuration of a communications system according to a third embodiment.

In the second embodiment, the SGW selecting device 60B accesses a selected MME 50 specified by the MME list and the selected MME 50 issues a connection request to a SGW 80 specified by the SGW list. In this embodiment, as illustrated in the system configuration diagram of a communications system 1C illustrated in FIG. 12, an entity selecting device 120 corresponding to the SGW selecting device 60B selects a C-Plane entity and a U-Plane entity. Here, the C-Plane entity is a node that transmits and receives a control signal, which is used to provide a communication service to be utilized by the UE 10, using a control plane which is a path through which the control signal is transmitted. The U-Plane entity is a node that transmits and receives a user signal, which is used to provide a communication service to be utilized by the UE 10, using a user plane which is a path through which the user signal is transmitted.

An address storage unit 73C of a DNS server 70C stores a plurality of tables in which "Service type" and "Address" are correlated as illustrated in FIG. 5. Specifically, a table in which an address of a C-Plane entity is set in the "Address" and a table in which an address of a U-Plane entity is set in the "Address" are stored. When a service type is received from the entity selecting device 120 and a transmission request for an address of a C-Plane entity and an address of a U-Plane entity is received, the DNS server 70C transmits the address of the C-Plane entity and the address of the U-Plane entity corresponding to the service type to the entity selecting device 120. Specifically, the DNS server 70C acquires the address of the C-Plane entity corresponding to the service type with reference to the table in which the address of the C-Plane entity is set, and acquires the address of the U-Plane entity corresponding to the service type with reference to the table in which the address of the U-Plane entity is set. Then, the DNS server 70C transmits the acquired addresses to the entity selecting device 120.

The entity selecting device 120 has functions corresponding to the service acquiring unit 61, the address requesting unit 62B, the address receiving unit 63B, and the connection requesting unit 64B which are illustrated in FIG. 9. Specifically, the entity selecting device 120 acquires a service type from the eNodeB 20. The entity selecting device 120 transmits the acquired service type to the DNS server 70C and transmits a transmission request for the address of the C-Plane entity and the address of the U-Plane entity. The entity selecting device 120 acquires one or more addresses of the C-Plane entity corresponding to the service type and one or more addresses of the U-Plane entity corresponding to the service type from the DNS server 70C. The entity selecting device 120 selects one or more addresses of the C-Plane entity and one or more addresses of the U-Plane entity from the acquired addresses, notifies the eNodeB 20 of the selected address, and requests connection.

Figure 13:
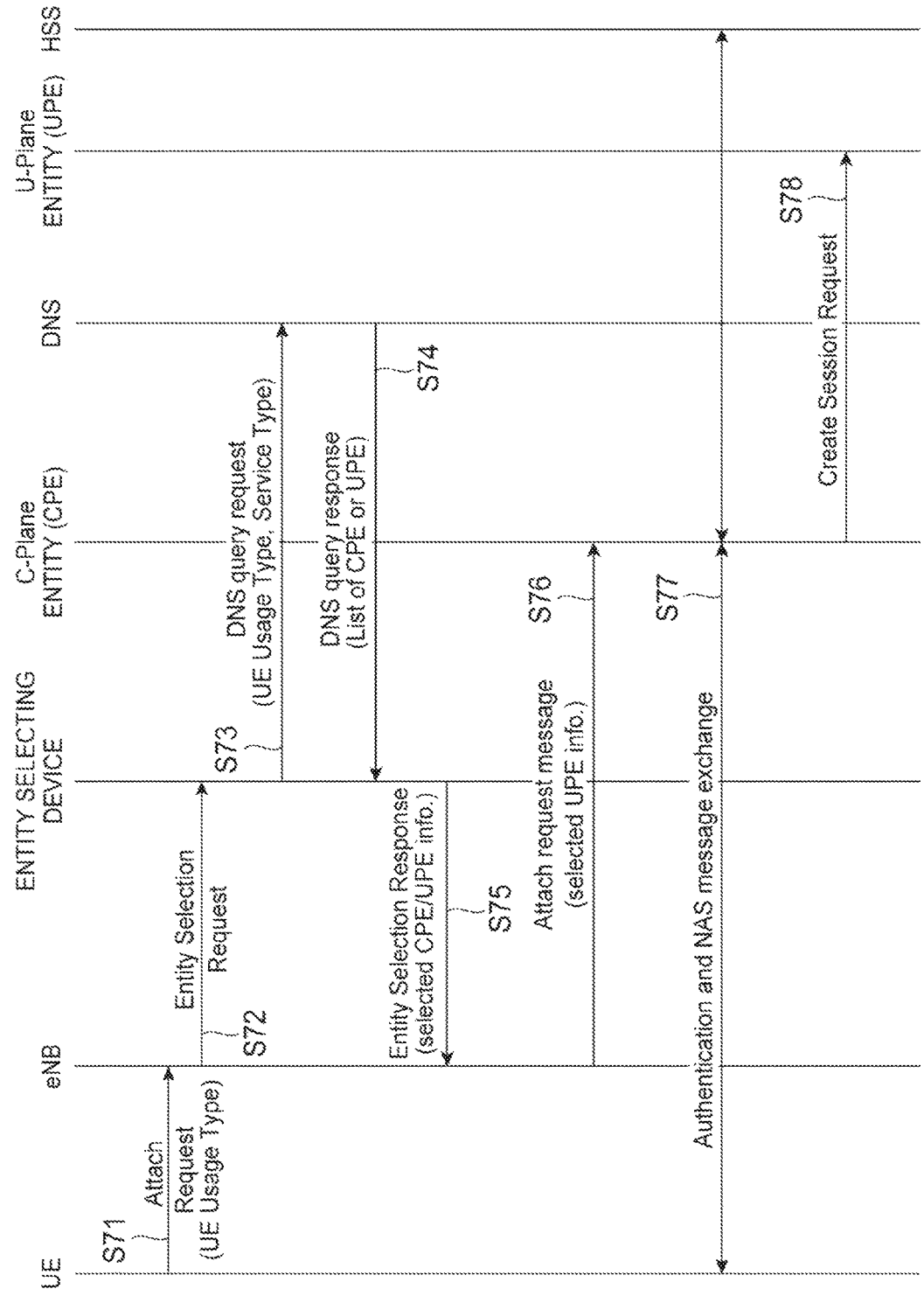
FIG. 13 is a sequence diagram illustrating an attachment process when a service type is acquired from a terminal.

A process of selecting a CPE (a C-Plane entity) and a UPE (a U-Plane entity) on the basis of the service type, which is performed by the entity selecting device 120, will be described below with reference to FIG. 13. First, the UE 10 issues an attachment request by transmitting an Attach Request signal to the eNodeB 20 (Step S71). The eNodeB 20 issues an entity selection request by transmitting a service type along with an Entity Selection Request signal to the entity selecting device 120 in response to the attachment request (Step S72).

The entity selecting device 120 transmits the service type to the DNS server 70C and requests addresses of the CPE and the UPE (DNS query request) (Step S73).

Steps S74 to S78 are the same as Steps S44 to S48 illustrated in FIG. 10 and thus description thereof will not be repeated.

As described above, the entity selecting device 120 can also select a C-Plane entity depending on a communication service.

Modified Examples

In the above-mentioned embodiment, the SGW selecting device 60A requests an address of a SGW 80 by receiving a service type and transmitting the service type to the DNS server 70A, but the SGW selecting device 60A may request an address of a SGW 80 by transmitting information indicating a service other than the service type to the DNS server 70A.

For example, a table (an APN table) in which a service type and an access point name (APN) are correlated as illustrated in FIG. 14(a) or a table (a DCN table) in which a service type and a dedicated core network (DCN) ID are correlated as illustrated in FIG. 14(b) is stored by the SGW selecting device 60A. That is, an APN or a DCN ID is correlated with a service type. A table in which an APN or a DCN ID and an address of a SGW 80 are correlated as illustrated in FIG. 14(c) is also stored. In this case, when a service type is received from the eNodeB 20, the SGW selecting device 60A searches the APN table or the DCN table and acquires an APN or a DCN ID (information indicating a service) corresponding to the service type. The SGW selecting device 60A transmits the acquired APN or the acquired DCN ID to the DNS server 70A and requests an address of a SGW 80. The DNS server 70A searches the tables, acquires an address corresponding to the received APN or the received DCN ID, and transmits the acquired address to the SGW selecting device 60A.

The SGW selecting device 60B or the entity selecting device 120 may store the APN table or the DCN table as described above in the example, transmit an APN or a DCN ID corresponding to the received service type to the DNS server 70B or the DNS server 70, and request an address.

Without being limited to the APN and the DCN ID, other information (for example, a UE Usage Type) indicating a service and another information element which is stored in a core network may be used. Information indicating a combination of a plurality of services as well as a single information element may be used.

A radio access network (RAN) may be employed instead of the eNodeB 20 described in the above-mentioned embodiments.

Regardless of whether it is called software, firmware, middleware, microcode, hardware description language, or another name, software can be interpreted broadly to refer to commands, a command set, codes, code segments, program codes, a program, a sub program, a software module, an application, a software application, a software package, a routine, a sub routine, an object, an executable file, an execution thread, an order, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

The terms described in this specification and/or the terms required for understanding this specification may be substituted with terms having the same or similar meanings. For example, a channel and/or a symbol may be a signal. A signal may be a message. A component carrier (CC) may be referred to as a carrier frequency, a cell, or the like.

The terms "system" and "network" which are used in this specification are compatibly used.

Information, parameters, and the like described in this specification may be expressed by absolute values, may be expressed by relative values to a predetermined value, or may be expressed by corresponding other information. For example, radio resources may be indicated by indices.

Names which are used for the parameters are not restrictive in any viewpoint. Expressions or the like using the parameters may be different from the expressions which are explicitly disclosed in this specification. Since various channels (for example, a PUCCH and a PDCCH) and information elements (for example, a TPC) can be distinguished by all appropriate names, various names given to various channels and information elements are not restrictive in any viewpoint.

A base station can cover one or more (for example, three) cells (which also referred to as sectors). When the base station covers two or more cells, the entire coverage area of the base station can be partitioned into a plurality of smaller sub areas, and each sub area may provide a communication service by a base station subsystem (for example, an indoor small base station remote radio head (RRH)). The term "cell" or "sector" refers to a partial or whole coverage area of a base station and/or a base station subsystem that provides a communication service in the coverage. The terms "base station," "eNB," "cell," and "sector" can be compatibly used in this specification. The base station may also be referred to as a fixed station, a NodeB, an eNodeB (eNB), an access point, a femtocell, a small cell, or the like.

A mobile station may also be referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or several appropriate terms by those skilled in the art.

The term "determining" which is used in this specification may include various types of operations. The term "determining" may include cases in which judging, calculating, computing, processing, deriving, investigating, looking up (for example, looking up in a table, a database, or another data structure), and ascertaining are considered to be "determined." The term "determining" may include cases in which receiving (for example, receiving information), transmitting (for example, transmitting information), input, output, and accessing (for example, accessing data in a memory) are considered to be "determined." The term "determining" may include cases in which resolving, selecting, choosing, establishing, comparing, and the like are considered to be "determined." That is, the term "determining" can include a case in which a certain operation is considered to be "determined."

The term "connected" or all modifications thereof refer to all direct or indirect connections between two or more elements and can include a case in which one or more intermediate elements are present between two elements "connected" to each other. The connecting of elements may be physical, or may be logical, or may be a combination thereof. In this specification, two elements can be considered to be "connected" to each other by using one or more electric wires, cables, and/or printed electric connections or by using electromagnetic energy such as electromagnetic energy having wavelengths in a radio frequency area, a microwave area, and a light (both visible light and invisible light) area as some non-restrictive and non-comprehensive examples.

An expression "on the basis of ~" which is used in this specification does not refer to "on the basis of only ~," unless apparently described. In other words, the expression "on the basis of ~" refers to both "on the basis of only ~" and "on the basis of at least ~."

Any reference to elements having names such as "first" and "second" which are used in this specification does not generally limit amounts or an order of the elements. The names can be conveniently used to distinguish two or more elements in this specification. Accordingly, reference to first and second elements does not mean that only two elements are employed or that the first element has to be prior to the second element in any form.

"means" in the above-mentioned configurations of the devices may be replaced with "unit," "circuit," "device," or the like.

As long as terms "including" and "comprising" and modifications thereof are used in this specification or the appended claims, the terms are intended to have a comprehensive meaning similar to a term "having." A term "or" which is used in this specification or the claims is intended not to mean an exclusive logical sum.

Transmission of information is not limited to the aspects/embodiments described in this specification, but may be performed using other methods. For example, the transmission of information may be performed by physical layer signaling (such as downlink control information (DCI) or uplink control information (UCI)), upper layer signaling (such as radio resource control (RRC) signal, medium access control (MAC) signaling, or broadcast information (master information block (MIB) and system information block (SIB))), other signals, or combinations thereof. The RRC signaling may be referred to as an RRC message and may be, for example, an RRC connection setup message or an RRC connection reconfiguration message.

The aspects/embodiments described in this specification may be applied to systems employing long term evolution (LTE), LTE-advanced (LTE-A), SUPER 3G IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which the systems are extended based thereon.

The processing sequences, the sequences, the flowcharts, and the like of the aspects/embodiments described above in this specification may be changed in the order as long as they are not incompatible with each other. For example, in the methods described in this specification, various steps as elements are described in an exemplary order and the methods are not limited to the described specific order.

Specific operations which are performed by a base station in this specification may be performed by an upper node thereof in some cases. In a network including one or more network nodes including a base station, various operations which are performed to communicate with a terminal can be apparently performed by the base station and/or network nodes (for example, an MME or an S-GW can be considered but the network nodes are not limited thereto) other than the base station. A case in which the number of network nodes other than the base station is one has been described above, but a combination of a plurality of different network nodes (for example, an MME and an S-GW) may be used.

The information or the like can be output from an upper layer (or a lower layer) to a lower layer (or an upper layer). The information or the like may be input or output via a plurality of network nodes.

Input and output information or the like may be stored in a specific place (for example, a memory) or may be managed in a management table. The input and output information or the like may be overwritten, updated, or added. The output information or the like may be deleted. The input information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison with a predetermined value).

The aspects/embodiments described above in this specification may be used alone, may be used in combination thereof, or may be switched in practical use thereto. Notification of predetermined information (for example, notifying of "X") is not limited to explicit notification, but may be performed by implicit broadcasting (for example, the predetermined information is not notified).

In the entire disclosure, for example, when an article such as a, an, or the is added in translation into English, such an article refers to including pluralities unless apparently recognized otherwise from the context.

While the invention has been described above in detail, it is apparent to those skilled in the art that the invention is not limited to the embodiments described in the specification. The invention can be modified and embodied as different aspects without departing from the concept and scope of the invention which are defined by the appended claims. Accordingly, the description in this specification is made for illustrative explanation and does not have any restrictive meaning.

REFERENCE SIGNS LIST 1A, 1B . . . Communications system, 10 . . . UE (terminal), 20 . . . eNodeB, 30 . . . Default MME, 60A, 60B . . . SGW selecting device, 61 . . . Service acquiring unit, 62A, 62B . . . Address requesting unit, 63A, 63B . . . Address receiving unit, 64A, 64B . . . Connection requesting unit, 70A, 70B . . . DNS server, 71A, 71B . . . Request receiving unit, 72A, 72B . . . Address retrieving unit, 73A, 73B . . . Address storage unit, 74A, 74B . . . Address notifying unit, 80 . . . SGW

The invention claimed is:

1. A communication control device selection method performed by a serving gateway (SGW) selecting device which performs the function of a mobility management entity (MME), the communication control device selection method of selecting a serving gateway (SGW) to be connected to a terminal (UE) in a communications system including the terminal that is able to utilize a first communication service and a second communication service other than the first communication service and communication control devices being serving gateways (SGWs) that transmit and receive data for utilizing the first communication service or the second communication service, the communication control device selection method comprising:

a selection step of specifying one communication service which is utilized by the terminal from among the first communication service and the second communication service, selecting a first communication control device being a first SGW when the specified communication service is the first communication service with reference to information in which the specified communication service and a communication control device being one of the SGWs that transmits and receives the data for utilizing the communication service are correlated with each other, and selecting a second communication control device being a second SGW other than the first communication control device being the first SGW when the specified communication service is the second communication service with reference to the information, wherein:

in response to an attachment request sent by the terminal, issuing, by an eNodeB, a MME retrieval request message to the SGW selecting device, in response to receiving the MME retrieval request message, issuing, by the SGW selecting device, a DNS query request including a service type and a UE usage type of the terminal to a DNS, in response to receiving the DNS query request, acquiring, by the DNS, an address of the SGW corresponding to the service type of the terminal and acquiring an address of the MME corresponding to the service type or the UE usage type, and transmitting the addresses of the selected MME and the selected SGW to the SGW selecting device in a DNS query response; and a transmitting step of transmitting a MME Selection Response message, by the SGW selecting device, indicating the address of the selected MME and the address of the selected SGW to the eNodeB.

2. The communication control device selection method according to claim 1, further comprising a connection step of connecting the terminal to the communication control device being the SGW which is selected in the selection step.

3. The communication control device selection method according to claim 1, wherein information indicating the communication service which is utilized by the terminal is acquired from the terminal and the communication service is specified using the information indicating the communication service.

4. The communication control device selection method according to claim 1, wherein information indicating the communication service which is utilized by the terminal is acquired from another device on the basis of information for identifying the terminal and the communication service is specified using the information indicating the communication service.

5. The communication control device selection method according to claim 1, wherein the selection step includes transmitting and receiving a control signal for the communication service which is utilized by the terminal as the data for utilizing the communication service using a control plane which is a path through which the control signal is transmitted.

6. A communications system configured to include:

a terminal that is configured to utilize a first communication service and a second communication service other than the first communication service;

communication control devices being serving gateways (SGWs) which are configured to transmit and receive data for utilizing the first communication service or the second communication service;

an eNodeB;

a mobility management entity (MME);

a DNS; and a serving gateway (SGW) selecting device, and wherein the SGW selecting device is configured with;

selection means that specifies one communication service which is utilized by the terminal from among the first communication service and the second communication service, selects a first communication control device being a first SGW when the specified communication service is the first communication service with reference to information in which the specified communication service and a communication control device being one of the SGWs that transmits and receives the data for utilizing the communication service are correlated with each other, and selects a second communication control device being a second SGW other than the first communication control device being the first SGW when the specified communication service is the second communication service with reference to the information, wherein:

in response to an attachment request sent by the terminal, the eNodeB is configured to issue a MME retrieval request message to the SGW selecting device, in response to receiving the MME retrieval request message, the SGW selecting device is configured to issue a DNS query request including a service type and a UE usage type of the terminal to the DNS, in response to receiving the DNS query request, the DNS is configured to acquire an address of the SGW corresponding to the service type of the terminal and acquiring an address of the MME corresponding to the service type or the UE usage type, and to transmit the addresses of the selected MME and the selected SGW to the SGW selecting device in a DNS query response, and the SGW selecting device is configured to transmit a MME Selection Response message indicating the address of the selected MME and the address of the selected SGW to the eNodeB.

* * * * *